US010892998B2

(12) United States Patent
Certain et al.

(10) Patent No.: US 10,892,998 B2
(45) Date of Patent: Jan. 12, 2021

(54) ADAPTIVE THROTTLING FOR SHARED RESOURCES

(71) Applicant: Amazon Technologies, Inc., Reno, NV (US)

(72) Inventors: Tate Andrew Certain, Seattle, WA (US); James R. Hamilton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 16/042,277

(22) Filed: Jul. 23, 2018

(65) Prior Publication Data
US 2018/0331971 A1   Nov. 15, 2018

Related U.S. Application Data

(63) Continuation of application No. 15/454,958, filed on Mar. 9, 2017, now Pat. No. 10,193,819, which is a
(Continued)

(51) Int. Cl.
*H04L 12/911* (2013.01)
*H04L 12/801* (2013.01)
(Continued)

(52) U.S. Cl.
CPC ........... *H04L 47/70* (2013.01); *G06F 9/00* (2013.01); *G06F 9/5061* (2013.01);
(Continued)

(58) Field of Classification Search
CPC ........ H04L 47/10; H04L 47/20; H04L 47/215
See application file for complete search history.

(56) References Cited

U.S. PATENT DOCUMENTS 6,038,195 A * 3/2000 Farmwald ............ G11C 7/1084
                                                    365/194
6,134,589 A   10/2000 Hultgren
(Continued)

FOREIGN PATENT DOCUMENTS

WO   2013013567        1/2013
WO   WO-2013013567 A1 * 1/2013  ........... H04L 47/215

OTHER PUBLICATIONS

Non-Final Office Action issued in U.S. Appl. No. 13/429,735 dated Dec. 17, 2014.
(Continued)

*Primary Examiner* — Shean Tokuta
(74) *Attorney, Agent, or Firm* — Hogan Lovells US LLP

(57) ABSTRACT

Customers of shared resources in a multi-tenant environment can have token buckets allocated that have an associated depth and fill rate, with each token enabling the customer to obtain an amount of work from a shared resource. A resource management system can monitor one or more system or output metrics, and can adjust a global fill rate based at least in part upon values of the monitored metrics. Such an approach can provide a fair distribution of work among the customers, while ensuring that the metrics stay within acceptable ranges and there are no drastic changes in performance levels of the system. The fill rate can update dynamically with changes in the monitored parameters, such that the system can float near an equilibrium point. Commitments for specific minimum service levels also can be met.

20 Claims, 5 Drawing Sheets

Related U.S. Application Data continuation of application No. 13/429,735, filed on Mar. 26, 2012, now Pat. No. 9,712,453.

(51) Int. Cl.
  *H04L 12/24* (2006.01)
  *H04L 12/26* (2006.01)
  *G06F 9/00* (2006.01)
  *G06F 9/50* (2006.01)

(52) U.S. Cl.
  CPC .......... *H04L 41/5009* (2013.01); *H04L 43/00* (2013.01); *H04L 43/0817* (2013.01); *H04L 43/0852* (2013.01); *H04L 47/10* (2013.01); *G06F 2209/504* (2013.01); *H04L 41/5025* (2013.01); *H04L 41/5035* (2013.01)

(56) References Cited

U.S. PATENT DOCUMENTS

| | | | |
|---|---|---|---|
| 6,202,127 B1 | 3/2001 | Dean et al. | |
| 6,424,624 B1* | 7/2002 | Galand | H04L 12/5601 370/231 |
| 7,301,905 B1* | 11/2007 | Tontiruttananon | H04L 47/10 370/232 |
| 7,586,848 B1* | 9/2009 | Gunduzhan | H04L 47/10 370/235 |
| 7,711,789 B1* | 5/2010 | Jnagal | G06F 3/0659 709/213 |
| 8,032,653 B1* | 10/2011 | Liu | H04L 47/22 709/235 |
| 8,190,593 B1* | 5/2012 | Dean | G06F 16/90335 707/707 |
| 8,417,812 B1* | 4/2013 | Gulati | G06F 3/06 709/224 |
| 8,463,909 B1 | 6/2013 | Szabo et al. | |
| 8,468,251 B1 | 6/2013 | Pijewski et al. | |
| 8,515,434 B1* | 8/2013 | Narendran | H04W 48/02 455/446 |
| 8,516,121 B1* | 8/2013 | Telang | H04L 47/25 709/226 |
| 8,560,577 B1 | 10/2013 | Ahmad | |
| 8,681,630 B1* | 3/2014 | Gibson | G06F 9/54 370/235 |
| 8,914,497 B1* | 12/2014 | Xiao | H04L 47/78 709/224 |
| 8,953,453 B1* | 2/2015 | Xiao | H04L 47/12 370/235.1 |
| 9,319,323 B2 | 4/2016 | Racz | |
| 9,712,453 B1 | 7/2017 | Certain et al. | |
| 9,867,167 B2* | 1/2018 | Wu | H04W 72/1257 |
| 10,193,819 B2 | 1/2019 | Certain et al. | |
| 2002/0165892 A1 | 11/2002 | Grumann et al. | |
| 2002/0191622 A1* | 12/2002 | Zdan | H04L 45/308 370/401 |
| 2003/0079019 A1 | 4/2003 | Lolayekar et al. | |
| 2003/0152084 A1* | 8/2003 | Lee | H04L 47/10 370/395.21 |
| 2004/0008625 A1* | 1/2004 | Lee | H04L 12/5601 370/229 |
| 2004/0184404 A1* | 9/2004 | Carpenter | H04L 43/00 370/235 |
| 2005/0080918 A1* | 4/2005 | Wu | H04L 47/2408 709/233 |
| 2005/0135378 A1* | 6/2005 | Rabie | H04L 47/10 370/395.21 |
| 2005/0174944 A1* | 8/2005 | Legault | H04L 47/10 370/235.1 |
| 2006/0179472 A1 | 8/2006 | Chang | |
| 2006/0274755 A1 | 12/2006 | Brewer et al. | |
| 2007/0005922 A1 | 1/2007 | Swaminathan et al. | |
| 2007/0079044 A1 | 4/2007 | Mandal | |
| 2007/0104103 A1* | 5/2007 | Howe | H04L 47/215 370/230.1 |
| 2007/0230502 A1* | 10/2007 | Lo | H04L 47/36 370/468 |
| 2008/0059557 A1 | 3/2008 | DeSantis | |
| 2008/0215738 A1 | 9/2008 | Kagan | |
| 2009/0099940 A1* | 4/2009 | Frederick | G06Q 30/0283 705/26.4 |
| 2009/0150572 A1 | 6/2009 | Allen, Jr. | |
| 2009/0172249 A1 | 7/2009 | Matthews | |
| 2009/0319745 A1 | 12/2009 | LaBerge | |
| 2010/0037031 A1 | 2/2010 | DeSantis | |
| 2010/0046374 A1* | 2/2010 | Ludwig | H04L 47/10 370/236 |
| 2010/0106820 A1 | 4/2010 | Gulati et al. | |
| 2010/0211681 A1* | 8/2010 | Chan | G06F 15/173 709/226 |
| 2010/0229218 A1 | 9/2010 | Kumbalimutt et al. | |
| 2010/0322071 A1* | 12/2010 | Avdanin | H04L 47/215 370/230 |
| 2010/0332871 A1* | 12/2010 | Allalouf | G06F 9/5094 713/320 |
| 2011/0075558 A1* | 3/2011 | Isaksson | H04L 47/22 370/230.1 |
| 2011/0075562 A1* | 3/2011 | Isaksson | H04L 47/215 370/235.1 |
| 2011/0199899 A1* | 8/2011 | Lemaire | H04L 47/2416 370/230.1 |
| 2011/0208854 A1* | 8/2011 | Zhang | G06F 9/5027 709/224 |
| 2012/0005367 A1* | 1/2012 | Bettink | H04L 47/41 709/233 |
| 2012/0026877 A1 | 2/2012 | Rajappan et al. | |
| 2012/0057605 A1* | 3/2012 | Ueta | H04L 47/215 370/450 |
| 2013/0019282 A1 | 1/2013 | Rice et al. | |
| 2013/0021858 A1 | 1/2013 | Chachad | |
| 2013/0060933 A1 | 3/2013 | Tung | |
| 2013/0081014 A1* | 3/2013 | Kadatch | G06F 3/067 718/1 |
| 2013/0166724 A1 | 6/2013 | Bairavasundaram | |
| 2013/0173803 A1 | 7/2013 | Pijewski et al. | |
| 2013/0194929 A1 | 8/2013 | Kaempfer et al. | |
| 2014/0321284 A1* | 10/2014 | Racz | H04L 47/31 370/235.1 |

OTHER PUBLICATIONS

Final Office Action issued in U.S. Appl. No. 13/429,735 dated Jun. 29, 2015.
Non-Final Office Action issued in U.S. Appl. No. 13/429,735 dated Feb. 11, 2016.
Final Office Action issued in U.S. Appl. No. 13/429,735 dated Jun. 29, 2016.
Notice of Allowance issued in U.S. Appl. No. 13/429,735 dated Jan. 3, 2017.
Non-Final Office Action issued in U.S. Appl. No. 15/454,958 dated Sep. 25, 2017.
Final Office Action issued in U.S. Appl. No. 15/454,958 dated Mar. 8, 2018.
Advisory Action issued in U.S. Appl. No. 15/454,958 dated Jun. 22, 2018.
Notice of Allowance issued in U.S. Appl. No. 15/454,958 dated Sep. 28, 2018.
Corrected Notice of Allowability issued in U.S. Appl. No. 15/454,958 dated Oct. 16, 2018.

* cited by examiner

ADAPTIVE THROTTLING FOR SHARED RESOURCES

CROSS-REFERENCES TO RELATED APPLICATIONS

This application is a continuation of U.S. application Ser. No. 13/429,735, filed Mar. 26, 2012, now U.S. Pat. No. 9,712,453, and U.S. application Ser. No. 15/454,958, filed Mar. 9, 2017, both entitled "ADAPTIVE THROTTLING FOR SHARED RESOURCES," which are incorporated herein by reference for all purposes.

BACKGROUND

As an increasing number of applications and services are being made available over networks such as the Internet, an increasing number of content, application, and/or service providers are turning to technologies such as remote resource sharing or "cloud computing." Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In some environments, multiple users can share resources such as data repositories, wherein the users can concurrently send multiple read and/or write requests to be executed against the same data instance, for example. Problems can arise, however, when the number of concurrent requests exceeds the ability of the instance to process those requests. In one example, a data server for an instance might get into an overload situation and begin putting back pressure on the incoming requests in order to reduce the rate of incoming requests and allow the system to recover from the overload situation. As a result of the push back, however, customers might not receive a desired or necessary rate of request handling (e.g., satisfying or otherwise processing received requests), which can upset the customers and in some cases cause the customers to look to other providers for data storage and similar resource usage.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of resource sharing and allocation in an electronic environment. In particular, various approaches monitor the values of one or more system or output metrics, or other such parameters, and can adjust at least one aspect of the system in order to attempt to maintain these metrics within acceptable or target value ranges. The adjustments can be made continually in order to provide a fair adjustment among customers that does not include sudden changes in performance levels.

In various embodiments, one or more token buckets can be provided to each of a plurality of customers. Each token bucket can contain a number of tokens up to a determined depth of the bucket, and each of those tokens can be redeemed by the customer for some amount of work or access to a resource in a multi-tenant environment. As tokens are removed from the buckets, the tokens can be replenished at, or up to, a determined token fill rate. The fill rate can be dynamically updated over time in response to changes in monitored system performance parameters, in order to ensure that customers are getting fair allocations of resource access and usage while maintaining the values of the performance parameters within allowable ranges.

Many other alternatives and variations are described and suggested below in relation to at least some of the various embodiments.

Figure 1:
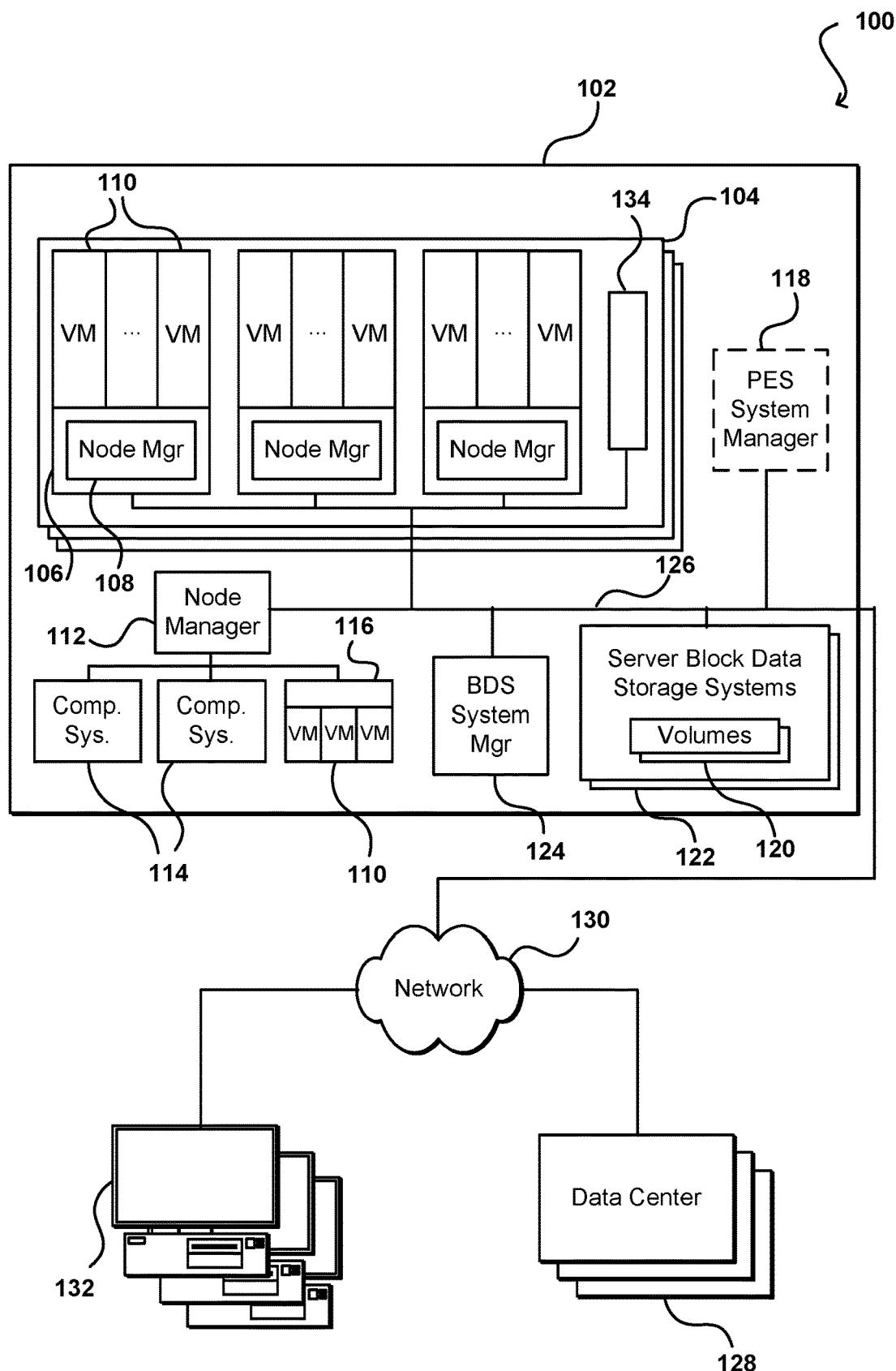
FIG. 1 illustrates an environment in which various embodiments can be implemented.

FIG. 1 illustrates an example network configuration 100 in which multiple computing systems are operable to execute various programs, applications, and/or services, and further operable to access reliable non-local block data storage, such as under the control of a block data storage service and/or program execution service, in accordance with various embodiments. In particular, in this example, a program execution service (PES) manages the execution of programs on various host computing systems located within a data center 102, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

In this example, a data center 102 includes a number of racks 104, each rack including a number of host computing devices 106, as well as an optional rack support computing system 134 in this example embodiment. The host computing systems 106 on the illustrated rack 104 each host one or more virtual machines 110 in this example, as well as a distinct Node Manager module 108 associated with the virtual machines on that host computing system to manage those virtual machines. One or more other host computing systems 116 may also each host one or more virtual machines 110 in this example. Each virtual machine 110 may act as an independent computing node for executing one or more program copies (not shown) for a user (not shown), such as a customer of the program execution service. In addition, this example data center 102 further includes additional host computing systems 114 that do not include distinct virtual machines, but may nonetheless each act as a computing node for one or more programs (not shown) being executed for a user. In this example, a Node Manager module 112 executing on a computing system (not shown) distinct from the host computing systems 114 and 116 is associated with those host computing systems to manage the computing nodes provided by those host computing systems, such as in a manner similar to the Node Manager modules 108 for the host computing systems 106.

The rack support computing system 134 may provide various utility services for other computing systems local to its rack 102 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system 118 is also illustrated that executes a PES System Manager module for the program execution service to assist in managing the execution of programs on the computing nodes provided by the host computing systems located within the data center (or optionally on computing systems located in one or more other data centers 128, or other remote computing systems 132 external to the data center). As discussed in greater detail elsewhere, a PES System Manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module may coordinate with the Node Manager modules 108 and 112 to manage program execution on computing nodes associated with the Node Manager modules, while in other embodiments the Node Manager modules may not assist in managing such execution of programs.

This example the data center 102 also includes a computing system 124 that executes a Block Data Storage ("BDS") system manager module for the block data storage service to assist in managing the availability of non-local block data storage to programs executing on computing nodes provided by the host computing systems located within the data center (or optionally on computing systems located in one or more other data centers 128, or other remote computing systems 132 external to the data center). In particular, in this example, the data center 102 includes a pool of multiple server block data storage systems 122, which each have local block storage for use in storing one or more volume copies 120. Access to the volume copies 120 is provided over the internal network(s) 126 to programs executing on various computing nodes 110 and 114. As discussed in greater detail elsewhere, a BDS System Manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager module may coordinate with the Node Manager modules to manage use of volumes by programs executing on associated computing nodes, while in other embodiments the Node Manager modules may not be used to manage such volume use. In addition, in other embodiments, one or more BDS System Manager modules may be structured in other manners, such as to have multiple instances of the BDS System Manager executing in a single data center (e.g., to share the management of non-local block data storage by programs executing on the computing nodes provided by the host computing systems located within the data center), and/or such as to have at least some of the functionality of a BDS System Manager module being provided in a distributed manner by software executing on some or all of the server block data storage systems 122 (e.g., in a Peer to-peer manner, without any separate centralized BDS System Manager module on a computing system 124).

In this example, the various host computing systems, server block data storage systems, and computing systems are interconnected via one or more internal networks 126 of the data center, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the server storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be approximately 4,000 computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 2:
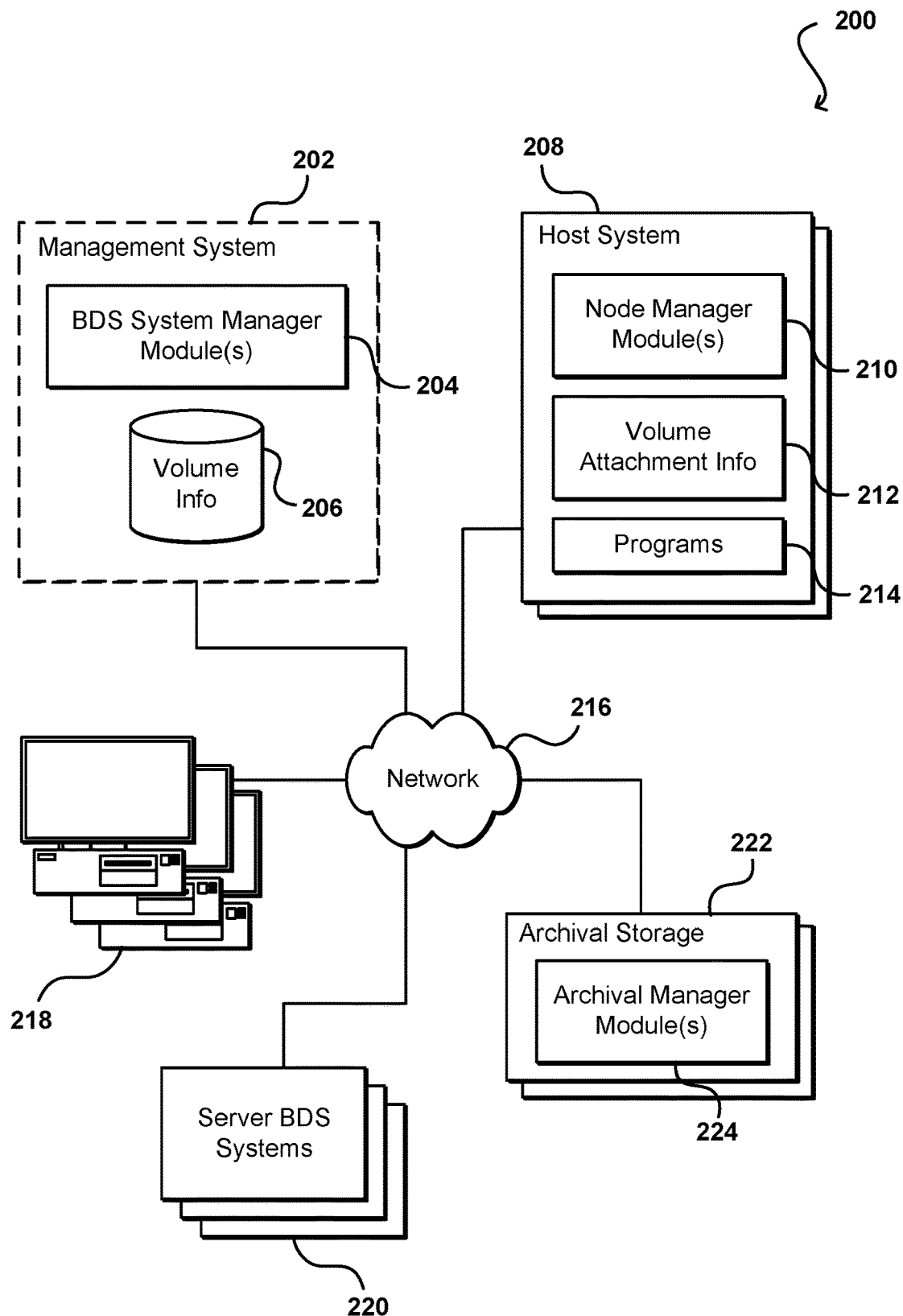
FIG. 2 illustrates an example separation of management and host components that can be used in accordance with various embodiments.

FIG. 2 illustrates an example environment 200 including computing systems suitable for managing the provision and use of reliable non-local block data storage functionality to clients that can be used in accordance with various embodiments. In this example, a management system 202, such as one or more server computers including one or more externally-facing customer interfaces, is programmed to execute an embodiment of at least one BDS System Manager module 204 to manage provisioning of non-local block data storage functionality to programs executing on host computing systems 208 and/or on at least some other computing systems 218, such as to block data storage volumes (not shown) provided by the server block data storage systems 220. Each of the host computing systems 208 in this example also executes an embodiment of a Node Manager module 210 to manage access of programs 214 executing on the host computing system to at least some of the non-local block data storage volumes, such as in a coordinated manner with the BDS System Manager module 204 over a network 216 (e.g., an internal network of a data center, not shown, that includes the computing systems 202, 208, 220, and optionally at least some of the other computing systems 218). In other embodiments, some or all of the Node Manager modules 210 may instead manage one or more other computing systems (e.g., the other computing systems 218).

In addition, multiple server block data storage systems 220 are illustrated that each can store at least some of the non-local block data storage volumes (not shown) used by the executing programs 214, with access to those volumes also provided over the network 216 in this example. One or more of the server block data storage systems 220 may also each store a server software component (not shown) that manages operation of one or more of the server block data storage systems, as well as various information (not shown) about the data that is stored by the server block data storage systems. Thus, in at least some embodiments, the server computing system 202 of FIG. 2 may correspond to the computing system 124 of FIG. 1, one or more of the Node Manager modules 108 and 112 of FIG. 1 may correspond to the Node Manager modules 210 of FIG. 2, and/or one or more of the server block data storage computing systems 220 of FIG. 2 may correspond to server block data storage systems 122 of FIG. 1. In addition, in this example embodiment, multiple archival storage systems 222 are illustrated, which may store snapshot copies and/or other copies of at least portions of at least some block data storage volumes stored on the server block data storage systems 220. The archival storage systems 222 may also interact with some or all of the computing systems 202, 208, and 220, and in some embodiments may be remote archival storage systems (e.g., of a remote storage service, not shown) that interact with the computing systems over one or more other external networks (not shown).

The other computing systems 218 may further include other proximate or remote computing systems of various types in at least some embodiments, including computing systems via which customers or other users of the block data storage service interact with the management and/or host systems. Furthermore, one or more of the other computing systems 218 may further execute a PES System Manager module to coordinate execution of programs on the host computing systems 208 and/or other host computing systems 218, or the management system 202 or one of the other illustrated computing systems may instead execute such a PES System Manager module, although a PES System Manager module is not illustrated in this example.

In the illustrated embodiment, a Node Manager module 210 is executing in memory in order to manage one or more other programs 214 executing in memory on the computing system, such as on behalf of customers of the program execution service and/or block data storage service. In some embodiments, some or all of the computing systems 208 may host multiple virtual machines, and if so, each of the executing programs 214 may be an entire virtual machine image (e.g., with an operating system and one or more application programs) executing on a distinct hosted virtual machine computing node. The Node Manager module 210 may similarly be executing on another hosted virtual machine, such as a privileged virtual machine monitor that manages the other hosted virtual machines. In other embodiments, the executing program copies 214 and the Node Manager module 210 may execute as distinct processes on a single operating system (not shown) executed on a single computing system 208.

The archival storage system 222 is operable to execute at least one Archival Manager module 224 in order to manage operation of one or more of the archival storage systems, such as on behalf of customers of the block data storage service and/or of a distinct storage service that provides the archival storage systems. In other embodiments, the Archival Manager module(s) 224 may instead be executing on another computing system, such as one of the other computing systems 218 or on the management system 202 in conjunction with the BDS System Manager module 204. In addition, while not illustrated here, in some embodiments various information about the data that is stored by the archival storage systems 222 may be maintained in storage for the archival storage systems or elsewhere.

The BDS System Manager module 204 and Node Manager modules 210 may take various actions to manage the provisioning and/or use of reliable non-local block data storage functionality to clients (e.g., executing programs), as described in greater detail elsewhere. In this example, the BDS System Manager module 204 may maintain a database 206 that includes information about volumes stored on the server block data storage systems 220 and/or on the archival storage systems 222 (e.g., for use in managing the volumes), and may further store various other information (not shown) about users or other aspects of the block data storage service. In other embodiments, information about volumes may be stored in other manners, such as in a distributed manner by Node Manager modules 210 on their computing systems and/or by other computing systems. In addition, in this example, each Node Manager module 210 on a host computing system 208 may store information 212 about the current volumes attached to the host computing system and used by the executing programs 214 on the host computing system, such as to coordinate interactions with the server block data storage systems 220 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 1-2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount allows them to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionality, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

In at least some embodiments, applications that access and use one or more such non-local block data storage volumes over one or more networks may each have an associated node manager that manages the access to those non-local volumes by the program, such as a node manager module that is provided by the block data storage service and/or that operates in conjunction with one or more Block Data Service (BDS) System Manager modules. For example, a first user who is a customer of the block data storage service may create a first block data storage volume, and execute one or more program copies on one or more computing nodes that are instructed to access and use the first volume (e.g., in a serial manner, in a simultaneous or other overlapping manner, etc.). When an application executing on a computing node initiates use of a non-local volume, the application may mount or otherwise be provided with a logical block data storage device that is local to the computing node and that represents the non-local volume, such as to allow the executing program to interact with the local logical block data storage device in the same manner as any other local hard drive or other physical block data storage device that is attached to the computing node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or computing node) so as to perform the interactions on that stored volume copy on behalf of the executing program. Furthermore, in at least some embodiments, at least some of the described techniques for managing access of applications and services to non-local block data storage volumes are automatically performed by embodiments of a Node Manager module.

In at least some embodiments, block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service ("PES") system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine computing nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all block data storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the block data storage service and/or program execution service.

As discussed above, however, such an approach can be problematic in situations such as where the number of requests waiting to be processed by an instance exceeds the ability of the instance to process those requests. Even if a customer is within the expected or allocated number or rate of requests for that customer, other customers submitting requests to that instance can exceed their allocation, creating an overload situation where the data server for the instance can begin putting back pressure on the incoming requests in order to reduce the rate of incoming requests and allow the system to move out of the overload situation. Thus, each customer on the device with pending requests can experience a decrease in the rate of request handling (the "request rate"), as well as other issues such as a decrease in available storage.

Systems and methods in accordance with various embodiments attempt to provide customers with a fair approach to the management and/or throttling of requests when a system or service reaches one or more conditions where at least one performance metric is not being met. Such an approach can attempt to honor any minimum levels of performance or other such guarantees, while maximizing resource utilization and not unfairly throttling any particular users. In at least some embodiments, each customer can have an allocated number or rate of operations, such as a number of input/output (I/O) operations per second (IOPS). Unless a customer has a guaranteed number of IOPS, the allocation to that customer can vary over time based at least in part upon current network conditions.

In at least some embodiments, each "requestor" is allocated at least one token bucket. A "requestor," as used herein, can refer to a customer volume, application, user, resource, or other such entity capable of submitting requests against one or more resources as discussed herein. A token bucket typically refers to an algorithm or module that can be used to ensure that requests or other transmissions for a given customer conform to defined network limits, such as limits on bandwidth or variations in packet flow. Each bucket can contain one or more "tokens," where each token refers generally to a unit of work that can be performed on behalf of a requestor at a given time. So, for example, if a customer has ten tokens in a bucket, where each of those tokens refers to an I/O request, then the customer can submit up to ten I/O requests at a time. For additional requests, the customer must wait until one of the earlier requests completes and one of the allocated tokens is "placed" back into that customer's bucket. In some embodiments, a token might be placed back into a customer's bucket as soon as a previous request is completed. In other embodiments, tokens might be added back into customer buckets based on a current load of the system, customer guarantees, relative customer allocations, and other such factors. The rate at which tokens are placed back into a customer's bucket, or the rate at which customers are able to submit additional requests or items of work after a maximum number of requests has been reached, is referred to herein as the token bucket fill rate. As known in the art, a request can require more than one token to process, depending upon factors such as the length of the packet in bytes, such that a request might have to wait until a sufficient number of tokens are available to process that packet. The maximum number of tokens that can be contained in a particular customer's bucket will be referred to herein as the "depth" of the bucket.

A difficulty can arise, in at least some situations, as to how to fairly adjust the fill rates and depths for various customer buckets under varying system conditions. While approaches can be utilized that scale all customers back at the same rate, or provide each customer a similar portion of the available resources, such an approach may not make efficient use of the available resources, as different customers require different amounts of those resources at different times. If the system maximizes for utilization, however, users with a significant number of requests might cause significant latency issues for customers with relatively few requests. It would be desirable to enable the system to maintain an acceptable level of latency while providing a fair throttling of customer request allocations when necessary.

Providing a fair approach and sufficient resource utilization with token buckets can be relatively tricky, however. Enabling customers to accumulate tokens up to the full allocated depth of the bucket can be risky, as a number of customers suddenly providing a lot of activity can cause the system to become overloaded. Approaches in accordance with various embodiments can instead set the depth of a bucket of each customer, or at least a group or type of customers, to one token. Setting the depth to one token, where each token might correspond to an I/O request, means that each customer can only submit requests up to the fill rate of the bucket. The system can set a relatively high fill rate, however, such that when the system is not running at full capacity the customer can receive another token in the bucket as soon as the previous token is used. In this way, each customer can be considered to have an infinite depth or fill rate, as a token can appear a short time after a previous token was used as long as system conditions allow.

Setting a fill rate for networking systems can be relatively straightforward, as the packets generally have a limited size so you can estimate the amount of work for a given set of tokens. For I/O requests or other such operations, however, the amount of work can vary significantly. For example, receiving several read operations in sequence can provide a much different load than receiving several write operations in sequence, as read operations are typically more sensitive to latency and are given at least some level of priority. While many write operations can be queued to be performed when possible (within a specified time limit, for example), read operations typically require access to disk with minimal latency, and only a limited number of read operations can be queued before the latency falls outside an acceptable range. Latency impacts can occur when the system is running out of memory, or when the disks and/or network are being overloaded, among other such issues. Such issues can cause a system to offer more tokens than can actually be handled, unless the number of tokens available is set to a very low number, which can result in resources being significantly underutilized.

Figure 3A:
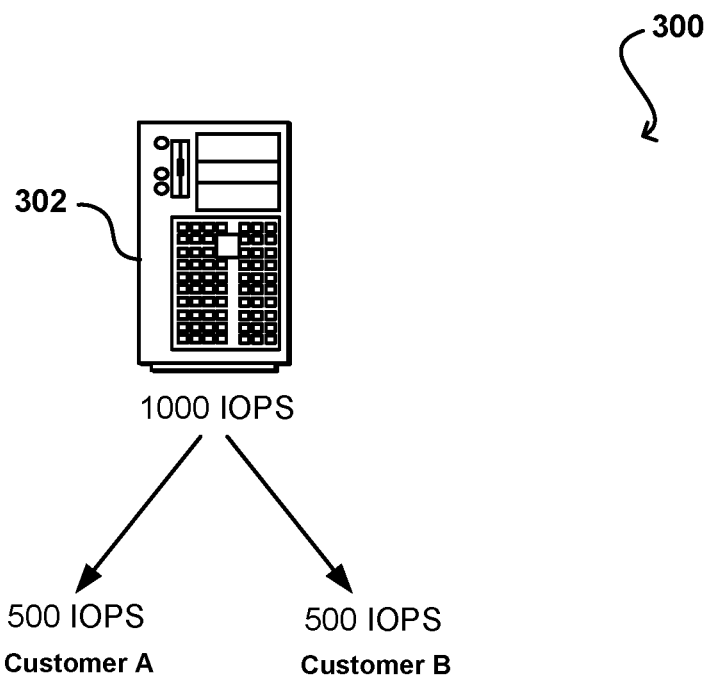
FIGS. 3(a) and 3(b) illustrate example allocations for multiple customers that can be used in accordance with various embodiments.

Further, it can be difficult to set a fill rate that is fair to all users in all situations. For example, consider the situation 300 of FIG. 3(*a*), where a resource 302, or set of resource, has a determined amount of IOPS that the resource can process. For this example, each I/O request will be considered to require a similar amount of work for purposes of explanation, although as discussed elsewhere herein such determinations are not as straightforward. If the resource is able to provide up to 1,000 IOPS, and there are two customers (A and B), then each of those customers can be allocated up to 500 IOPS, which can utilize the system resources and provide a fair distribution among the customers. The distribution can quickly get complicated, however, such as in the situation 320 of FIG. 3(*b*). In this example two more customers (C and D) have obtained or activated token buckets. In order to be fair, each customer would obtain a fill rate corresponding to 250 IOPS. In this example, however, customer A still wants to be able to utilize 500 IOPS, while the other three customers will utilize 250 IOPS or less. Throttling all the customers down to 250 may be unfair to customer A, but enabling customer A to keep all 500 IOPS and then splitting the rest among the other customers may not be fair to the other customers either.

Figure 3B:
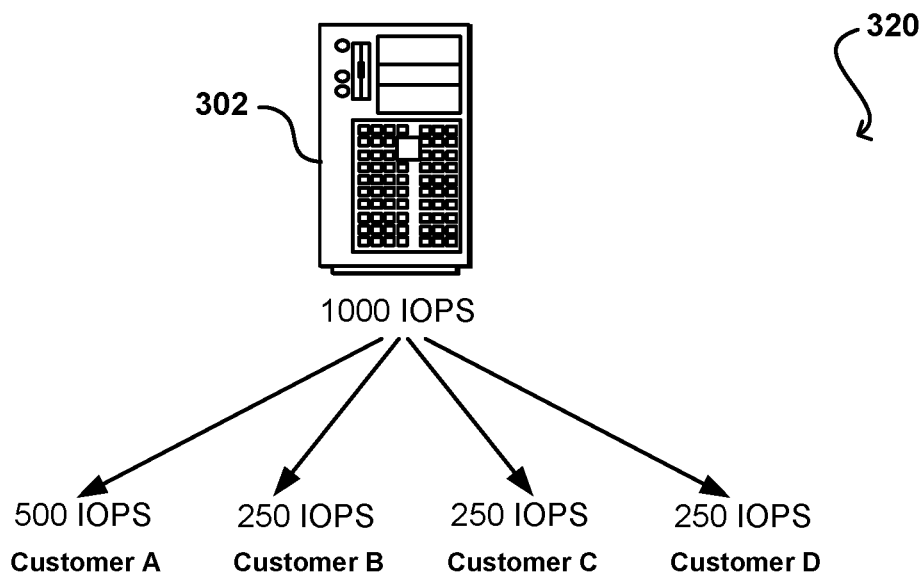

Systems and methods in accordance with various embodiments can address these and other deficiencies in conventional approaches to resource allocation by utilizing what is referred to herein as a "floating" maximum I/O rate, or a "floating" fill rate. These rates are said to be "floating" because the values of these rates can be adjusted dynamically based on various network conditions. In the situation of FIG. 3(b), for example, the floating rate can be set to a relatively high number, such as a maximum of 1,000 IOPS, when the system is operating with sufficient capacity. In this way, each of the customers can obtain their desired amount of IOPS. If the customers start using closer to their relative allocation, however, such that one or more system metrics start to approach an undesirable value, the rate can be lowered or otherwise adjusted downward. Anyone attempting to utilize less than the floating rate can be unaffected, while users with higher usage can be clipped by the floating rate until the one or more metrics are back within an acceptable range. Such an approach can provide a natural equilibrium point for the system based on system performance parameters, without having to determine why certain metrics are approaching undesirable values or the source of the change in those metrics. Further, such an approach does not have to determine information about the usage of any specific customers, and can instead adjust the rate based on observed system performance.

In at least one embodiment a floating maximum bucket fill rate is determined and applied to at least a set of customers of a common type. If any requestor attempts to obtain more than the maximum fill rate, that requestor will be throttled by the token bucket. Any requestors attempting to obtain less than the maximum fill rate will be unaffected. Such an approach enables the system to honor its commitments to the extent possible, and utilize resources to the extent practical, while throttling when necessary to prevent unnecessary latency issues. Thus, in the situation of FIG. 3(b) the fill rate might float down to a value of around 350, for example, where Customer A would feel some of the impact of the system experiencing a potential issue, but Customer A would still receive more usage of the system than the other customers who are not even using the 250 allocation.

The fill rate can be tied to various metrics in the system. For example, the fill rate can be affected by process metrics such as available CPU capacity, memory usage, network usage, and number of pending I/O requests, for example, as well as output metrics such as read request latency. Each of these metrics can have at least one constraint set such that, when a metric approaches, reaches, or passes that constraint value, the fill rate can be adjusted by a determined amount. In at least some embodiments, the maximum fill rate can be adjusted when any of these metrics is approaching its constraint value, in order to prevent the metric from passing its constraint. As the metric value falls back into a preferred or allowable range, for example, the maximum fill rate can increase as long as the metrics remain in within their constraints, until the fill rate is back to its maximum value. In some embodiments, the speed with which the maximum rate changes depends at least in part upon how close a given metric is to its constraint. An attempt can be made in at least some embodiments to find an equilibrium point in the acceleration for various metrics, where the value of those metrics may not be as important as ensuring that the metrics are no longer increasing towards values outside their respective constraints.

As discussed, such an approach can be advantageous over conventional approaches that attempt to determine an amount of resources that are being consumed in a multi-tenant resource environment. For example, a conventional system might attempt to determine the number of I/O operations that a particular disk can handle. If a disk (or array of disks) is determined to be able to handle 1,000 IOPS, for example, a conventional approach would be to refill a global token bucket at 1,000 IOPS and distribute those tokens to various customer buckets according to a hierarchical distribution scheme. It is not possible, however, to know how many I/O operations a system can actually handle, as the actual I/O capacity depends upon factors such as how many of the I/O requests are sequential or semi-random, the block size for various requests, and other such information. The best determination that can be made in at least some embodiments is a predicted range of capability, and to be sure to not overload the system a conservative approach would be to utilize the bottom end of that range, which could result in the resources generally being under-utilized.

Approaches in accordance with various embodiments can instead determine one or more output parameters of importance, such as a latency of request processing, particularly for read operations. As long as the latency is within an acceptable range, the system might not adjust or throttle the current fill rate. If the latency goal is a value less than x milliseconds, for example, the system might start adjusting the maximum fill rate when the system reaches some value less than x, such as 0.5x milliseconds. If the latency continues to increase from 0.5x milliseconds towards x milliseconds, the maximum fill rate can be further reduced. In at least some embodiments, an adjustment configuration algorithm can be set up such that the rate is adjusted so the latency never reaches the latency constraint. For example, there can be no throttling when the system is less than 0.5x, and complete throttling when the system would otherwise get to x. In other embodiments, there might be a fill rate threshold that the system does not adjust beneath, even where the latency may exceed the constraint for a period of time. Various other approaches can be used as well within the scope of the various embodiments.

The rate at which the throttling is implemented can vary as well. In some embodiments, there can be a linear adjustment between the values at which the system starts throttling and reaches a maximum amount of throttling. In other embodiments, there might be an exponential or logarithmic adjustment, whereby the adjustment starts out small but the rate at which the adjustment increases goes up faster as the latency values increases. Other formulas or approaches can be used as well, such as may use quadratic equations and the like.

In addition to the output metrics, a rate adjustment process can also look at various system metrics as well. For example, one approach might attempt to prevent the amount of available memory or disk space from dropping below a specified value. Similarly, the system might want to prevent processor usage from exceeding a certain value. Various other such parameters can be considered as well.

In at least some embodiments, at least the rate adjustment portion of the system does not attempt to determine a reason or source for these parameter values going outside an acceptable range, but instead adjusts the fill rate to bring the system back within the acceptable ranges. And an amount of the adjustment can depend at least in part upon the rate at which one or more of these system or output metrics is approaching a constraint or other such value. In at least some embodiments, the amount of adjustment is continuous according to a relatively smooth function, such that customers will not experience a drastic change in service for normal fluctuations in load, although for catastrophic events the throttling might quickly engage as should be understood.

In some embodiments the adjustment can be based on the monitored metric value that is most approaching its limit. For example, each metric might be normalized to a value between 0 and 1, where 0 corresponds to a metric value that is within its acceptable range, 1 is a metric value at its constraint value, and values in between 0 and 1 correspond to values where the system has determined it appropriate to adjust the maximum fill rate, or another such parameter. In some embodiments, the system will take the highest number for the various parameters and adjust the fill rate based on that number. For example, if memory usage is at a 0.4, CPU usage is at a 0.7, latency is at a 0.3, number of queued I/O operations is at a 0.4, and network bandwidth is at 0.6, the system will take the 0.7 value for the CPU usage and adjust the fill rate based on that number. In other embodiments, information for these parameters can be input into an algorithm that produces a number, such as from 0 to 1, that can be used to adjust the fill rate. In some embodiments, a value of 0 or 0 to 0.3 might have no fill rate adjustment, where a value between 0.3 and 1.0 might have differing amounts of fill adjustment, and at 1 there might be complete throttling and the fill rate dropped to 0.0. Various other approaches can be used as well.

In a specific example, r can be the number of system-wide outstanding reads and w can be the number of system-wide outstanding writes. A function ρ(r) can be defined mapping r to a range from 0 to 1, where 0 means essentially no read load and 1 means maximal read load. A similar function ω(w) can be defined for writes. For example, ρ(r) and ω(w) could be defined as follows:

$$\rho(r) = \frac{r_{max} - r}{r_{max} - r_{min}}$$

where $r_{min}$ is the number of outstanding reads below which there is no throttling and $r_{max}$ is the maximum number of outstanding reads the system is constrained to maintain. Similarly, $$\omega(w) = \frac{w_{max} - w}{w_{max} - w_{min}}$$

where $w_{min}$ is a cache level for writes below which there is no fill adjustment, and where $w_{max}$ is the maximum allowable page cache.

Based at least in part upon these values, the fill rate (or replenishment rate) can be given by:

$$R(w,r) = R_{min} \cdot \min(\omega(w), \rho(r)) \cdot (R_{max} - R_{min})$$

where $R_{max}$ is the maximum allowed replenishment rate and $R_{min}$ is the minimum allowable replenishment rate.

As discussed, certain users might want to have guarantees or minimum levels of performance that are different from other users, who might pay less to receive a "best effort" or similar type of approach. In at least some embodiments, a rate adjustment algorithm or similar process can attempt to provide these users with their guaranteed levels of service while maintaining equilibrium in the system. In one embodiment, an approach will attempt to provide the guarantees first, and then put everyone else on a similar fill rate for any requests above the guarantees. In some embodiments, the allocations can exceed a determined system capacity estimate, with the understanding that the overall fill level will be adjusted if system parameters start approaching unacceptable values as discussed elsewhere herein. Referring back to the situation in FIG. 3(b), customer A might have a guarantee of 250 IOPS, and the system might determine that based on the current number of customers and other such factors that each customer can be allocated 250 IOPS. While this value of 1,250 allocated IOPS may exceed the 1,000 estimated IOPS that the system can handle, the system will only be at risk of bogging down if the actual number of IOPS requests received, and thus one or more of the monitored metrics, approaches the limit of the system at any given time. In such a situation the actual total allocated amount may not be of significance, as the system will naturally find an appropriate equilibrium point by adjusting the fill rate for current system metric values. Thus, at some point customer A might get 375 and each other customer 125, where customer A gets the 250 IOPS commitment first and then a determined 125 is allocated to each customer on top of any committed amount.

In some embodiments a random sampling of values might be used to determine an appropriate global fill rate. For example, the latency of reads might be analyzed for only a subset of resource customers, in order to require less processing and increase the speed at which fill rate adjustments can be made. There also can be privileged or higher importance customers, volumes, or other such entities, where a latency impact for one of these privileged entities can cause the system to throttle more aggressively. For example, while the load can be computed as a value from 0 to 1, the load can be allowed to go from 0 to 2, where a value between 1 and 2 causes the system to start dropping customers below their guaranteed levels of service. Thus, at a value of 1 the system might only be meeting its guarantees, and at a value above 1 the system might not provide those guaranteed levels until, at a value of 2, there are no I/O operations being provided on the system. Such an approach might only be used in certain critical situations, such as where a disk or server is experiencing an error, a runaway process is consuming a substantial amount of system resources, etc. The system attempts to adjust the performance continuously in order to provide uniform, fair performance among customers while trying to enable the system to recover from an undesirable state.

Figure 4A:
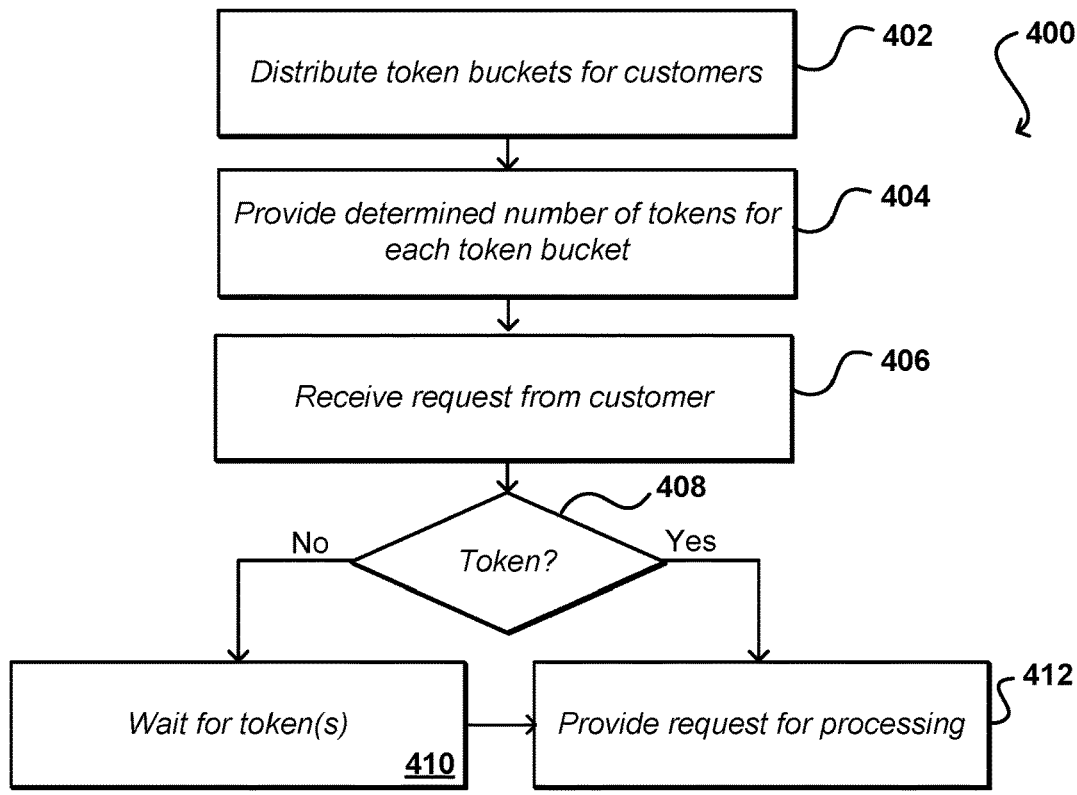
FIGS. 4(a) and 4(b) illustrate portions of an example process for adjusting a maximum rate that can be used in accordance with various embodiments.
Figure 4B:
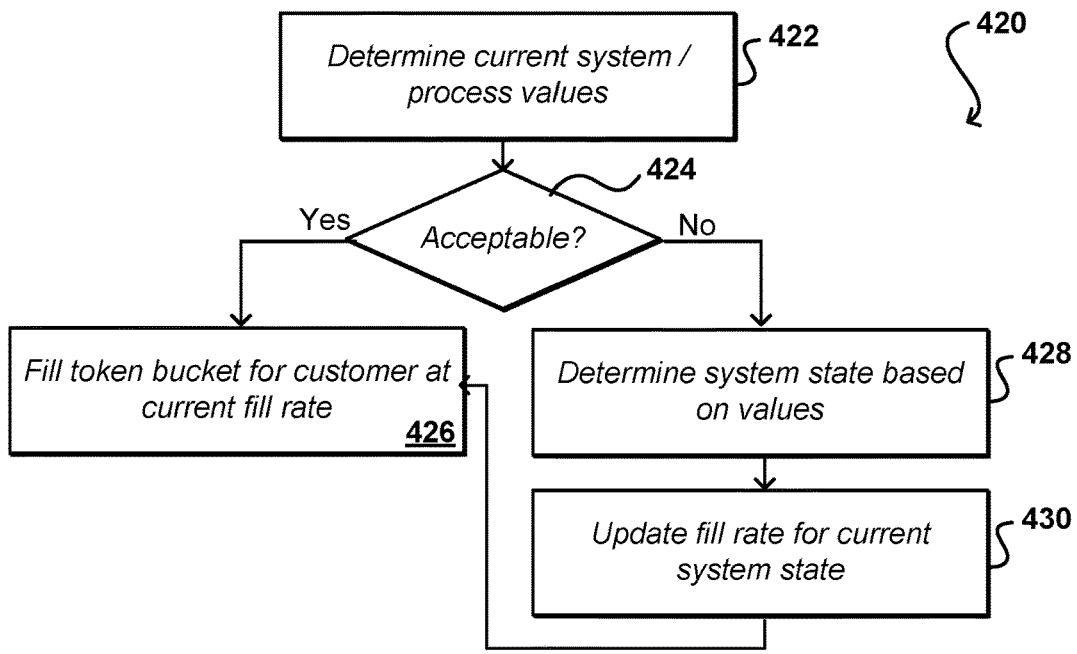

FIGS. 4(a) and 4(b) illustrate portions of an example process for managing a fill rate for token buckets that can be utilized in accordance with various embodiments. It should be understood, however, that there can be additional, fewer, or alternative steps performed in similar or alternative orders, or in parallel, within the scope of the various embodiments unless otherwise stated. In the first portion 400 of the example process, token buckets are distributed 402 to each of a plurality of customers or other such requestors. A determined number of tokens is provided 404 to be "placed" into each respective bucket. As mentioned, each token can be "redeemed" by the customer to obtain an amount of work, such as to have an I/O request processed. Each bucket can have a determined depth or capacity, and can store a number of tokens up to the depth of the bucket. When a request is received 406 for a customer, a determination can be made 408 whether there are enough tokens in the customer's token bucket to enable the request to be processed at the current time. If not, information for the request can be queued and the system can wait 410 for a sufficient number of tokens to be present in the respective token bucket. When there are a sufficient number of tokens in the bucket, the request can be provided 412 to an appropriate resource for processing. This can include, for example, forwarding information for the request to a server operable to perform a read or write operation for the request.

A second portion 420 of the process is illustrated in FIG. 4(b). This portion can be performed concurrently with the first portion, at or around the time that the token is removed from the token bucket, or at another appropriate time. The system can determine 422 one or more system or output metric values, as discussed elsewhere herein. A determination can be made 424 as to whether these values are within an acceptable range, and if so the token bucket for the customer can be refilled 426 at the current fill rate, and the process can continue. If one or more of the metric values are not within an acceptable range, an overall system state value can be determined 428 in at least some embodiments, such as by determining an extent to which one or more of the metric values is approaching a maximum value, minimum value, or other such constraint. Based at least in part upon the system state value, the fill rate for the token buckets can be updated 430 and the token buckets can be filled at the updated fill rate. As discussed, the fill rate can be continually updating in at least some embodiments in order to provide a relatively continuous and fair level of service to most or all of the customers. Also as discussed, in at least some embodiments customers may receive guaranteed levels of service in addition to, or instead of, levels based on the current fill rate. Various other approaches can be utilized as well within the scope of the various embodiments.

It also should be understood that, although I/O requests are used with various examples for purposes of explanations, various other types of information and/or processing can utilize aspects of the various embodiments as discussed and suggested herein. For example, any system can receive one or more streams of input workload and can have various types of capacity. Such a system can monitor levels of that capacity and adjust an amount of workload that the system will accept at any given time. Such approaches can be used for networking or data transfer systems as well.

In some embodiments an algorithm also can attempt to determine values for metrics associated with the customer devices. For example, a system resource might provide service with a certain level of latency, but there might be another issue causing delays such that the perceived latency from the perspective of a client device is outside an acceptable range. Accordingly, approaches in accordance with various embodiments can attempt to utilize this information as another input to the throttling algorithm, such that the fill rate can be floated down to attempt to help another portion of the system recover from whatever issue is leading to the perceived latency issue.

Various embodiments can also attempt to be less conservative and attempt to provide better system utilization. For example, instead of throttling based on the state of a metric that is closest to its constraint value, a combination of the values for each monitored metric can be used that attempts to perform a less drastic reduction in the fill rate, in order to give the system a chance to correct itself. Such an approach can still continue to reduce the fill rate while the system is out of the desired operating parameters, but might throttle at a slightly slower rate. Certain approaches can also factor in the rate of change, or acceleration, in the various parameter values to attempt to predict when, whether, and/or by how much a parameter will fall outside a target range, and make one or more preemptive adjustments to attempt to keep the parameter values within the target ranges.

As mentioned, in some cases a request might require multiple tokens to process. It may be the case, then, that a request might require more tokens than is allowed in a bucket for a current depth setting. In such cases, a user might be able to draw out more tokens than are available in the bucket. In at least one embodiment, a customer can "borrow" against future tokens when the customer is only submitting a single request, an average usage is low, a system capacity is at a specified value, or another such criterion is satisfied. For example, if a customer submits a request that requires eight tokens to process, and the bucket depth is set to five, a customer might have to "borrow" three tokens to process the request. In at least some embodiments, the "current" level of the bucket might then go to −3, such that the user will have to wait a time sufficient for three tokens to fill the bucket to get back to a normal state, and then wait a time sufficient for a number of tokens to be placed in the bucket to process the next request. In some embodiments, a user must have a full bucket to withdraw additional tokens, while in other embodiments the user must have at least one or more tokens in order to borrow tokens to process a request. Various other such approaches can be used as well within the scope of the various embodiments.

In some embodiments, the system might also automatically adjust other rates or resource commitments for various users. For example, a customer might be willing to pay for different levels of commitments at different times, but might not want to pay for the highest commitment rate when the customer is not using much of the committed capacity. In one such embodiment, a customer can select two or more levels, tiers, or other values that can be used for commitment rates at various times. For example, a customer might be willing to pay for a committed rate of up to 500 IOPS if the committed rate is being used at least 75% of capacity. If the usage is less than 75% for a period of time, the committed rate might drop to a lower value, such as a committed rate of 350 IOPS. The rate might stay at 350 IOPS until either the usage drops below 75% of the 350 IOPS for a period of time, at which time the rate might adjust to 200 IOPS, or the usage increases to at least 110% of the committed rate for a period of time, at which time the committed rate might adjust back to 500 IOPS. The periods of time necessary to increase or decrease the committed rate might be different, as the customer might favor either having committed rates for requests as much as possible or only paying for higher committed rates when absolutely necessary, for example. Further, there can be any appropriate thresholds, number of tiers, possible rates, or other such values within the scope of the various embodiments.

In some embodiments, an increase in rate commitment can be tied to the processing performance of the I/O requests for a customer. For example, a customer with a specified commitment rate might not want to increase the rate as long as the customer's I/O requests are being processed in a timely fashion. As discussed, excessive requests can be processed in a timely fashion as long as there is sufficient uncommitted capacity on a resource, or there is unused committed capacity. If the resource enters an overload situation, for example, the excess requests may not be processed in a timely fashion, and could be slowed down in order to attempt to recover from the excessive load. The customer can authorize the system in such a situation to automatically increase the committed rate, on the same resource or a different resource, in order to ensure that subsequent requests from the customer are processed in a timely fashion. Similarly, the usage of various resources can be monitored such that if capacity exists, the customer can automatically drop down to a lower committed rate as long as any excess requests will likely be processed without significant delay.

By providing commitments at varying granularities, a provider can provide a number of different pricing schemes. For example, a user might pay a certain amount for each committed IOPS, such as $0.30 per guaranteed IOPS, whether or not the user actually uses that amount. Thus, if a user purchases a commitment of 100 IOPS for a month, the user would pay $30 regardless of the actual usage, as the user is paying for the commitment. Various other pricing approaches can be used as well, such as various tiered pricing schemes. In other embodiments, a user might pay a premium for a level of committed IOPS, but that amount might be offset by the amount of unused commitment that was utilized by other users. For example, a user might pay $30 for 100 IOPS for a month, but if on average other users utilized 25 of those committed IOPS allocated to that customer, the customer might see a reduction such as $0.05 per IOPS, for a total monthly fee of $25. If the rate is adjusted during a specific period of time, the charge to the customer can reflect the different rates apportioned over that period.

As discussed, a customer might go over their committed amount as well. Various pricing approaches can be used for these extra IOPS within the scope of various embodiments. In one embodiment, the customer is charged the same for the excess IOPS as any customer having un-committed IOPS (e.g., $0.10 per IOPS), and the customer requests are treated the same as these requests. In other embodiments, the customer can select to pay extra per IOPS to be handled with the other requests, but given priority over standard requests. In some embodiments, a customer can pay a premium to have their excess requests processed within the available committed resources of another customer, such that the requests will be handled as a committed request as long as at least one other customer on the resource is below their level of commitment. While customers may want the ability to spike request rates if needed, in certain embodiments users might be capped at a certain level, whether to limit customer costs, ensure certain levels of quality of service, or for other such reasons. The ability to exceed guaranteed levels can also be beneficial to customers who are scaling a system or application, as the customer can determine areas of need without suffering significantly in quality of service.

Figure 5:
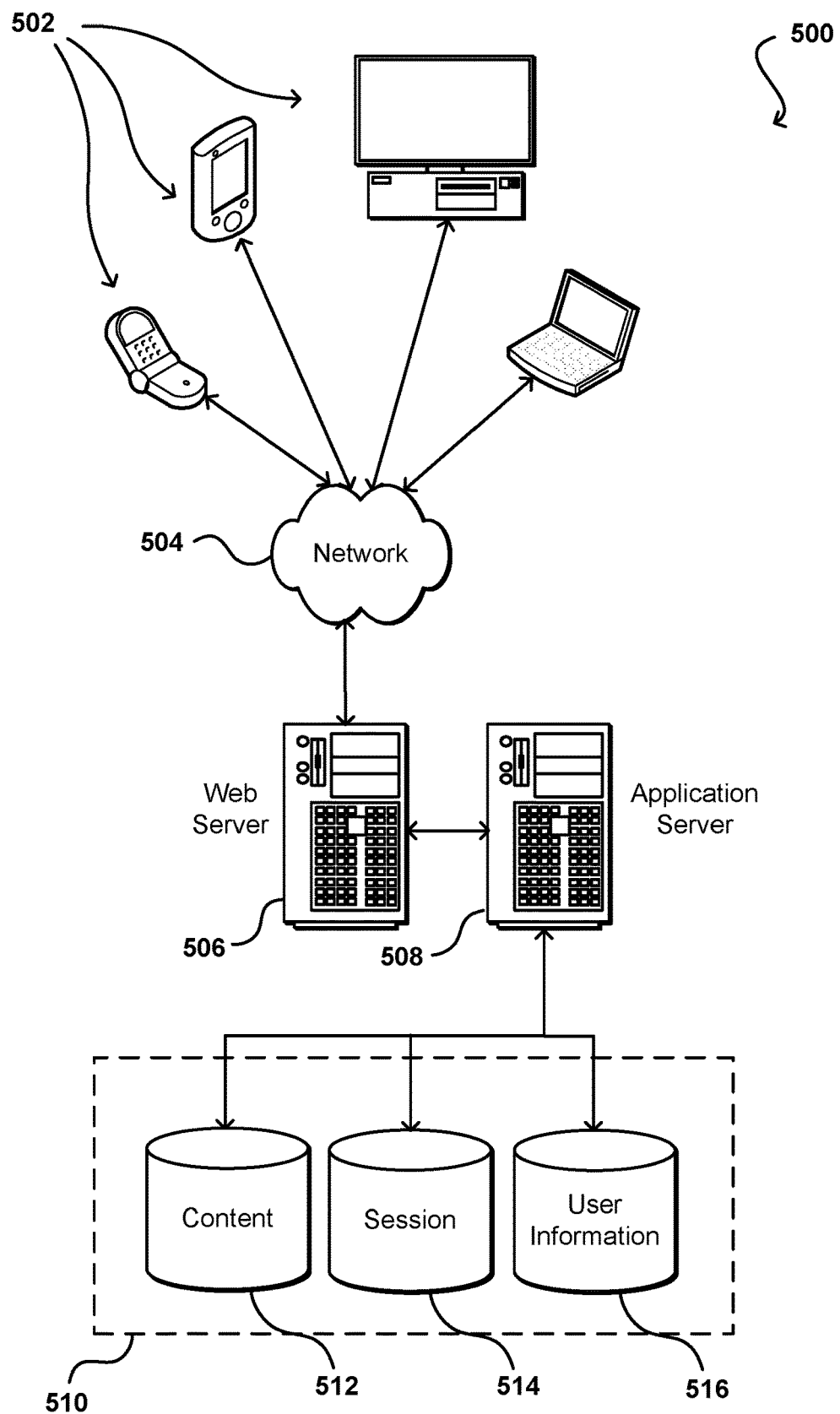
FIG. 5 illustrates an example environment that can take advantage of functionality of the various embodiments.

As discussed, different approaches can be implemented in various environments in accordance with the described embodiments. For example, FIG. 5 illustrates an example of an environment 500 for implementing aspects in accordance with various embodiments. As will be appreciated, although a Web-based environment is used for purposes of explanation, different environments may be used, as appropriate, to implement various embodiments. The system includes an electronic client device 502, which can include any appropriate device operable to send and receive requests, messages or information over an appropriate network 504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 506 for receiving requests and serving content in response thereto, although for other networks, an alternative device serving a similar purpose could be used, as would be apparent to one of ordinary skill in the art.

The illustrative environment includes at least one application server 508 and a data store 510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 508 can include any appropriate hardware and software for integrating with the data store 510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 506 in the form of HTML, XML or another appropriate structured language in this example. The handling of all requests and responses, as well as the delivery of content between the client device 502 and the application server 508, can be handled by the Web server 506. It should be understood that the Web and application servers are not required and are merely example components, as structured code discussed herein can be executed on any appropriate device or host machine as discussed elsewhere herein.

The data store 510 can include several separate data tables, databases or other data storage mechanisms and media for storing data relating to a particular aspect. For example, the data store illustrated includes mechanisms for storing content (e.g., production data) 512 and user information 516, which can be used to serve content for the production side. The data store is also shown to include a mechanism for storing log or session data 514. It should be understood that there can be many other aspects that may need to be stored in the data store, such as page image information and access rights information, which can be stored in any of the above listed mechanisms as appropriate or in additional mechanisms in the data store 510. The data store 510 is operable, through logic associated therewith, to receive instructions from the application server 508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed:

1. A computer-implemented method, comprising:
   allocating use credits to a first user based, at least in part, on a number of input/output (I/O) operations to be performed by the first user;
   receiving a request, from the first user, to perform an I/O operation;
   determining the number of credits allocated to the first user is sufficient to perform the I/O operation;

determining a first value for a performance parameter of a network resource, the first value being selected from a plurality of monitored metrics, the first value determined at least in part on a highest normalized value of the plurality of monitored metrics;

determining a second value for the second performance parameter of a network resource, the second value being different from the first value and selected from the plurality of monitored metrics:

determining a first adjustment to a credit replenishment rate, based on the first value, is larger than a second adjustment to the credit replenishment rate, based on the second value; and adjusting the credit replenishment rate for the first user, based at least in part on the second value.

2. The computer-implemented method of claim 1, wherein the performance parameter includes at least one of a memory usage amount, a processor usage amount, a storage space amount, a network usage amount, or a number of pending I/O operations.

3. The computer-implemented method of claim 2, further comprising:
determining at least one constraint associated with the performance parameter, the at least one constraint setting a threshold value for adjusting the credit replenishment rate.

4. The computer-implemented method of claim 1, further comprising:
determining a depth of a bucket corresponding to the first user, the bucket storing the use credits;
deallocating use credits from the first user according to the depth of the bucket, wherein a number of use credits within the bucket is capped by the depth of the bucket.

5. The computer-implemented method of claim 1, further comprising:
determining the plurality of monitored metrics, each monitored metric of the plurality of monitored metrics having a metric value;
comparing each metric value of the plurality of monitored metrics; and
selecting a highest metric value.

6. The computer-implemented method of claim 5, further comprising:
normalizing each metric value of the plurality of monitored metrics.

7. The computer-implemented method of claim 5, further comprising:
determining the second value of the performance parameter exceeds a threshold; and
deallocating use credits from the first user based, at least in part, on the second value.

8. A system for managing shared computing resources, comprising:
at least one processor; and
memory including instructions that, when executed by the at least one processor, cause the system to:
allocate use credits to a first user based, at least in part, on a number of input/output (I/O) operations to be performed by the first user;
receive a request, from the first user, to perform an I/O operation; determine the number of credits allocated to the first user is sufficient to perform the I/O operation;
determine a first value for a performance parameter of a multi-tenant environment, the value being selected from a plurality of monitored metrics, the first value determined at least in part on a highest normalized value of the plurality of monitored metrics;

determine a second value for the second performance parameter of a network resource, the second value being different from the first value and selected from the plurality of monitored metrics:

determine a first adjustment to a credit replenishment rate, based on the first value, is larger than a second adjustment to the credit replenishment rate, based on the second value: and adjust the credit replenishment rate for the first user, based at least in part on the second value.

9. The system of claim 8, wherein the performance parameter includes at least one of a memory usage amount, a processor usage amount, a storage space amount, a network usage amount, or a number of pending I/O operations.

10. The system of claim 9, wherein the instructions, when executed by the at least one processor, further cause the system to:
determine at least one constraint associated with the performance parameter, the at least one constraint setting a threshold value for adjusting the credit replenishment rate.

11. The system of claim 8, wherein the instructions, when executed by the at least one processor, further cause the system to:
determine a depth of a bucket corresponding to the first user, the bucket storing the use credits; and
deallocate use credits from the first user according to the depth of the bucket, wherein a number of use credits within the bucket is capped by the depth of the bucket.

12. The system of claim 8, wherein the instructions, when executed by the at least one processor, further cause the system to:
determine the plurality of monitored metrics, each monitored metric of the plurality of monitored metrics having a metric value;
compare each metric value of the plurality of monitored metrics; and
select a highest metric value.

13. The system of claim 12, wherein the instructions, when executed by the at least one processor, further cause the system to:
normalize each metric value of the plurality of monitored metrics.

14. The system of claim 12, wherein the instructions, when executed by the at least one processor, further cause the system to:
determine the second value of the performance parameter exceeds a threshold; and
deallocating use credits from the first user based, at least in part, on the second value.

15. A non-transitory computer-readable storage medium including instructions that, when executed by at least one processor of a computing device, cause the computing device to:
allocate use credits to a first user based, at least in part, on a number of input/output (I/O) operations to be performed by the first user;
receive a request, from the first user, to perform an I/O operation;
determine the number of credits allocated to the first user is sufficient to perform the I/O operation;
determine a first value for a performance parameter of a multi-tenant environment, the first value being selected from a plurality of monitored metrics, the first value determined at least in part on a highest normalized value of the plurality of monitored metrics;

determine a second value for the second performance parameter of a network resource, the second value being different from the first value and selected from the plurality of monitored metrics;

determine a first adjustment to a credit replenishment rate, based on the first value, is larger than a second adjustment to the credit replenishment rate, based on the second value; and adjust the credit replenishment rate for the first user, based at least in part on the second value.

16. The non-transitory computer-readable storage medium of claim 15, wherein the performance parameter includes at least one of a memory usage amount, a processor usage amount, a storage space amount, a network usage amount, or a number of pending I/O operations.

17. The non-transitory computer-readable storage medium of claim 15, wherein the instructions, when executed by the at least one processor of the computing device, cause the computing device to:

determine at least one constraint associated with the performance parameter, the at least one constraint setting a threshold value for adjusting the credit replenishment rate.

18. The non-transitory computer-readable storage medium of claim 15, wherein the instructions, when executed by the at least one processor of the computing device, cause the computing device to:

determine a depth of a bucket corresponding to the first user, the bucket storing the use credits;

deallocate use credits from the first user according to the depth of the bucket, wherein a number of use credits within the bucket is capped by the depth of the bucket.

19. The non-transitory computer-readable storage medium of claim 15, wherein the instructions, when executed by the at least one processor of the computing device, cause the computing device to:

determine the plurality of monitored metrics, each monitored metric of the plurality of monitored metrics having a metric value;

compare each metric value of the plurality of monitored metrics; and select a highest metric value.

20. The non-transitory computer-readable storage medium of claim 19, wherein the instructions, when executed by the at least one processor of the computing device, cause the computing device to:

normalize each metric value of the plurality of monitored metrics.

\* \* \* \* \*